(12) United States Patent
Muth (10) Patent No.: US 10,294,679 B2
(45) Date of Patent: May 21, 2019

(54) SUPPORT BRACKET FOR SHELVING AND SCAFFOLDING

(71) Applicant: Scaff-All, Inc., Anchorvile, MI (US)

(72) Inventor: James Muth, Oconomowoc, WI (US)

(73) Assignee: Scaff-All, Inc., Anchorville, MI (US)

( * ) Notice: Subject to any disclaimer, the term of this patent is extended or adjusted under 35 U.S.C. 154(b) by 0 days.

(21) Appl. No.: 15/906,564

(22) Filed: Feb. 27, 2018

(65) Prior Publication Data

US 2018/0245356 A1    Aug. 30, 2018

Related U.S. Application Data

(60) Provisional application No. 62/463,950, filed on Feb. 27, 2017.

(51) Int. Cl.
| | |
|---|---|
| *E04G 3/20* | (2006.01) |
| *A47B 96/02* | (2006.01) |
| *F16M 13/02* | (2006.01) |
| *F16B 2/12* | (2006.01) |
| *A47B 96/06* | (2006.01) |
| *A47B 96/07* | (2006.01) |

(52) U.S. Cl.
CPC .............. *E04G 3/20* (2013.01); *A47B 96/027* (2013.01); *A47B 96/061* (2013.01); *A47B 96/07* (2013.01); *F16B 2/12* (2013.01); *F16M 13/022* (2013.01)

(58) Field of Classification Search
CPC . E04G 3/20; F16B 2/12; F16B 13/022; A47B 96/027; A47B 96/061
See application file for complete search history.

(56) References Cited

U.S. PATENT DOCUMENTS

| | | | | |
|---|---|---|---|---|
| 3,554,477 A | * | 1/1971 | D'Altrui | A47B 57/565 108/148 |
| 3,854,686 A | * | 12/1974 | Konstant | A47B 57/52 108/108 |
| 4,519,512 A | * | 5/1985 | Frazier | A47B 57/565 211/193 |
| 6,758,448 B1 | * | 7/2004 | Williams | A47B 96/02 248/125.1 |
| 7,195,213 B2 | * | 3/2007 | Weatherly | A47B 81/061 248/124.1 |
| 8,453,387 B2 | * | 6/2013 | Goepfert | A47B 47/05 248/245 |

* cited by examiner

*Primary Examiner* — Jeanette E Chapman
(74) *Attorney, Agent, or Firm* — The Weintraub Group, P.L.C.

(57) ABSTRACT

A support bracket for securement to a vertically extending wall stud and providing cantilevered support of a horizontally disposed shelf unit, the support bracket incorporating a support arm and a vertically movable stud gripping mechanism, the mechanism including a pair of side plates that are laterally adjustable for movement and securing connection where desired onto studs of differing widths. The support arm is longitudinally elongate and includes support webs on each side for supporting an opposite end of a shelf, the webs including linear spacers and apertures for positioning and enabling securement of a shelf end to the bracket. Multiple pairs of support brackets enable a succession of shelf units to be assembled into side-by-side relation on respective studs to form a substantially continuous elongated horizontal surface.

14 Claims, 9 Drawing Sheets

SUPPORT BRACKET FOR SHELVING AND SCAFFOLDING

CROSS-REFERENCE TO RELATED APPLICATIONS

This application is a completion application and claims the priority benefit of U.S. Provisional Patent Application Ser. No. 62/463,950, filed Feb. 27, 2017, for "Support Bracket for Shelving and Scaffolding," the entire disclosure of which is hereby incorporated by reference in its entirety, including the drawings.

TECHNICAL FIELD

This invention relates to support structures, and more particularly to a wall mounted support bracket for shelving and scaffolding.

BACKGROUND OF THE INVENTION

It is known in the art relating to shelving and scaffolding to use brackets that are affixed along a wall in a generally level and spaced apart fashion to support an elongated plank or board to form a shelf. It is also known to erect a plurality of standalone shelving units along a wall. However, such conventional shelving systems may be difficult to install, may not support a heavy load, may not maximize the amount of usable storage space along a wall, and may not provide easy access for loading and unloading items.

Examples of support structures, and more particularly to a wall mounted support bracket for shelving and scaffolding are disclosed in U.S. Pat. No. 3,606,217 to Leiferman, U.S. Pat. No. 3,567,261 to Akczinski, U.S. Pat. No. 4,033,531 to Levine, U.S. Pat. No. 4,993,670 to Tesar, U.S. Pat. No. 5,529,273 to Benthin, Patent Application 2009/0113839 to Carr, and Des. Pat. 396,800 to Prince et al.

A "Support Bracket Securable to an Upwardly extending Wall Stud" is disclosed in U.S. Pat. No. 7,360,627, the disclosure of which is hereby incorporated by reference in its entirety, including the drawings. While suitable for the purposes intended, a one piece channeled base employed therein could limit use on wall studs at places where needed.

The present invention seeks to improve upon the prior art by providing a simplified support bracket that is mounted to vertically oriented laterally spaced wall studs of different thicknesses and enables a user to assemble shelving units above the ground, desirably in in side-by-side relation, as well as in horizontal layers. Such a support bracket enables the user to rapidly assemble storage units as well as work benches in factories and the like.

The above publications are identified herein in recognition of a duty of disclosure of related subject matter, which may be relevant under 37 CFR 1.56, and specifically incorporated herein by reference as regards the conventional approaches and constructions taught therein.

Additionally, while each of the devices disclosed in the above prior published documents are believed to have been suitable for the uses and problems then intended to solve, there is an ongoing need for improvements in the design of security display cases, such as simpler and more compact designs and ease of operation.

SUMMARY OF THE INVENTION

This invention is directed to a support bracket for shelving and scaffolding, a shelving and scaffolding support system, and a method of supporting a shelf, as shown and described herein, including equivalents hereto.

In a first aspect, the present invention is directed to a support bracket for securement to a vertically extending wall stud and providing cantilevered support of a horizontally disposed plank, the support bracket incorporating a vertically oriented laterally adjustable stud gripping mechanism to enable securement and connection of the bracket where desired on studs of differing widths.

The bracket is longitudinally elongate and includes support webs on each side of the bracket whereby multiple brackets can be mounted on a succession of studs and support work or storage planks to be assembled into an elongated horizontal surface.

According to this invention, there is disclosed a support bracket to attach a scaffold to a substantially vertically oriented stud mounted to a wall, the stud having a front surface spaced from the wall and first and second side surfaces defining a U-shape with predefined width, the bracket comprising:

a longitudinally elongated scaffold support beam having an inner first end and an opposed outer second end, and an adjustable connection mechanism adapted to attach the support beam to the stud, the connection mechanism comprising a vertically oriented U-shaped member that is fixedly attached to the first end and adapted to fit about the stud, the connection mechanism comprising a pair of vertically oriented sidewalls that are laterally separated and adapted to be adjusted towards and away from one another to enable the connection mechanism to grip the first and second sides of studs of different widths.

The U-shaped member of the support bracket comprises first and second L-shaped clamping bracket, the brackets each including, respectively, a foot and a sidewall, the foot of the first bracket fixedly connected to the first end of the support beam, the foot of the second bracket disposed for movement atop the foot of the first bracket, and a fastening arrangement for releasably connecting the feet of the brackets together in a manner that the lateral separation between the sidewalls can be changed to fit about the stud in a manner that the sidewalls are moved into clamping engagement with the stud.

The fastening arrangement includes the first foot including at least one elongated horizontal slot, and preferably two vertically separated slots, a threaded stem that extends from the second foot and through the slot for constrained horizontal movement therewithin, and a fastener that connects with the stem and forces the feet together into clamped relation.

In another aspect according to this invention, there is provided a shelving and scaffolding assembly, comprising:

a pair of studs, said studs being mounted on a wall in laterally separated relation and in a substantially vertical orientation and each including a front surface spaced from the wall and first and second side surfaces;

a pair of platform support brackets, said support brackets mounted in cantilever fashion onto one and the other respective stud, each support bracket comprising:

a longitudinally extending support beam, each beam having first and second ends, and an adjustable connection mechanism attached to the first end to connect the support beam to a stud, the connection mechanism including first and second L-shaped flanges disposed in nested relation and forming a U-shaped channel member, the first L-shaped flange including a foot fixedly attached to the first end of the support beam and a leg adapted to engage one side surface of the stud, the second L-shaped flange including a foot movably disposed against the foot of the first flange and a leg adapted to engage the other side surface, and a securement arrangement for fixedly securing the feet together and against movement when the channel member is seated about the stud, the feet being disposed against the front surface, and the legs of the flanges being abutted against the side surfaces; and a fastening arrangement to fixedly attach the U-shaped channel member of the bracket to a respective stud, and a planar scaffold platform connected to and extending horizontally between the support beams.

Desirably the support bracket of the invention hereof enables a user to easily provide a horizontal support or working surface in the existing structure of a facility that does not take up floor space, protectively enables important materials to be stored above the workspace and protected from attack, such as water damage or accidents arising from work activities, can handle heavy loads, can be used as a work table as well as a vertical storage assembly.

Importantly, the storage bracket enables adjustment so that the support brackets can be adjusted to readily fit about wall studs of different thickness from the floor to the storage area. The shelving is accessible and the height thereof changed readily.

Additionally, if used alone, the brackets may be used to support or hang objects above the ground, such as tools, small electrical machinery, construction materials, such as a ladder and other like apparatus, and provides ease of access.

These and other features and advantages of the invention will be more fully understood from the accompanying drawings. In the drawings like reference characters refer to like parts throughout the views, in which:

DETAILED DESCRIPTION OF THE PREFERRED EMBODIMENTS

The present invention provides a support bracket 10 for shelving and scaffolding. The support bracket 10 is mountable on a variety of sizes of upright wall studs 12 including 2"×4", 2"×6", 4"×4", 6"×6" stud posts or similar.

A plurality of the support brackets 10 may be arranged on a plurality of such vertically extending wall studs 12 in order to support horizontally disposed and elongated shelf members 14 including 2"×4" support studs 16 and 2"×12" planks 18 that together with the support brackets form a robust shelving surface along a wall. The support bracket thereby provides for a shelving support system that can sustain heavy loads, that is easily accessible, and that better utilizes the storage space along the wall of a structure such as but not limited to a warehouse, barn, garage, or similar.

The wall stud 12 presents a generally rectangular U-shaped cross section and includes a front face 12A and a pair of sides 12B and 12C. Typically, the wall stud has a predetermined width "W", but this may vary.

Figure 1:
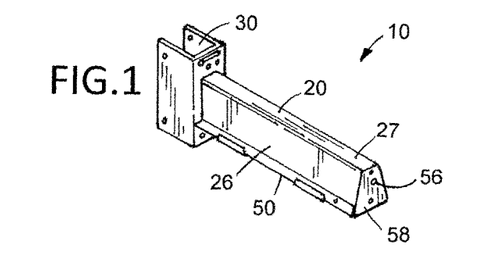
FIG. 1 is a perspective view of a support bracket in accordance with the invention.
Figure 2:
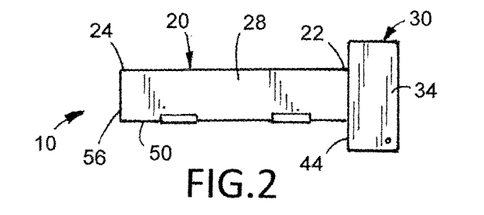
FIG. 2 is a side view of the support bracket shown in FIG. 1.
Figure 3:
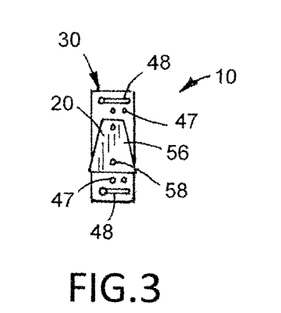
FIG. 3 is an end view of the support bracket shown in FIG. 1.
Figures 4, 5, 6:
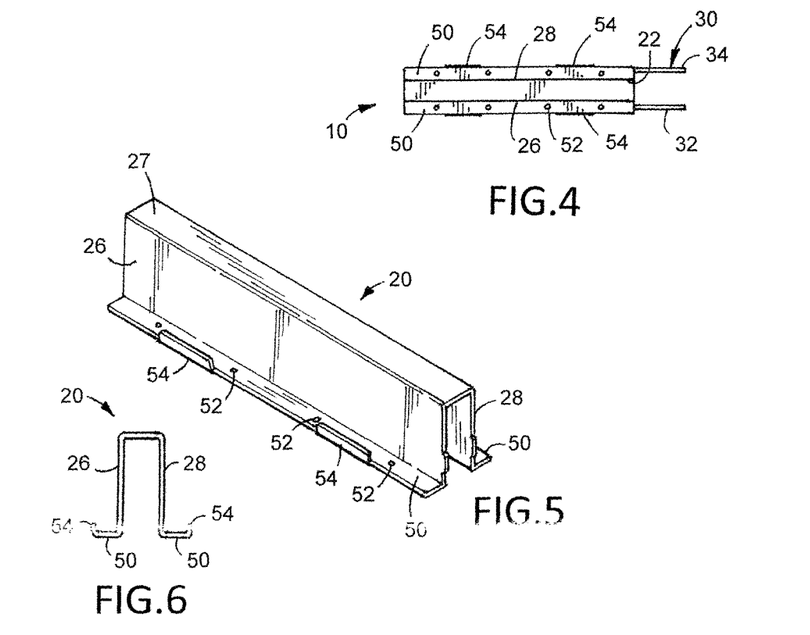
FIG. 4 is a bottom view of the support bracket shown in FIG. 1.
FIG. 5 is a perspective view of an arm or support beam of the support bracket shown in FIG. 1.
FIG. 6 is an end view of the support beam shown in FIG. 5.

More particularly, a support bracket 10 in accordance with the invention includes an elongated arm or support beam 20 having an inner end 22, an opposite outer end 24, and first and second opposite sides 26 and 28. The arm 20. may be, for example, a three-dimensional channel having an inverted U-shape in a right side up disposition of the support bracket.

Figure 7:
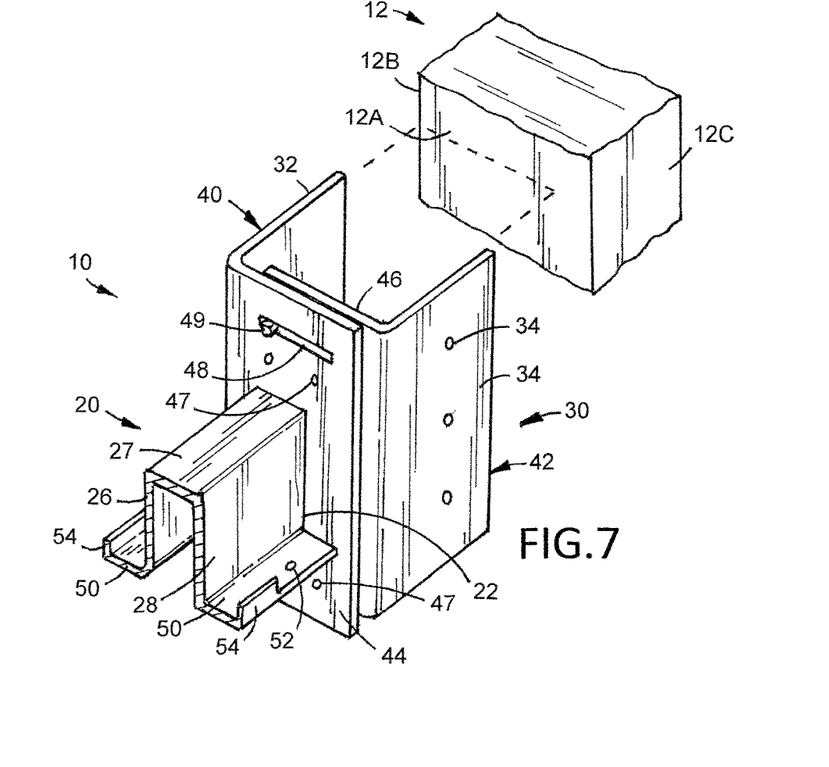
FIG. 7 is a perspective view of an adjustable connection mechanism of the support bracket shown in FIG. 1.

A channel mount or connection mechanism 30 extends rearwardly from the inner end 22 of the elongated arm 20. The mount 30 includes a pair of spacedly disposed side plates 32 and 34 that can be seated over a wall stud 12 to mount the support bracket. Each side plate 32 and 34 includes a plurality of apertures 36 through which fasteners may be inserted to secure the mount 30 to the wall stud. The distance between the side plates 32 and 34 are adjustable to accommodate a range of sizes or widths of wall studs.

Figure 8:
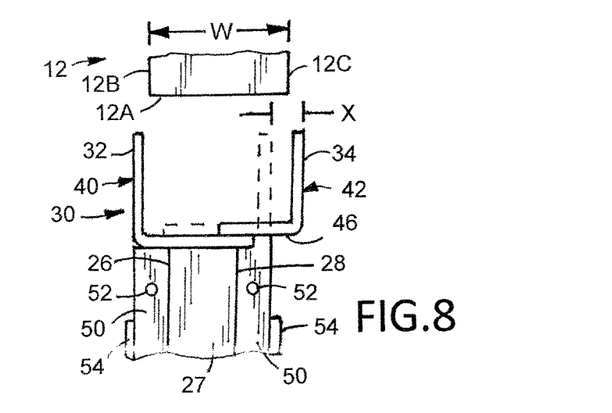
FIG. 8 is a plan view looking down at the connection mechanism being positioned for mounting to a wall stud and being adjusted for the width of the stud.
Figure 9:
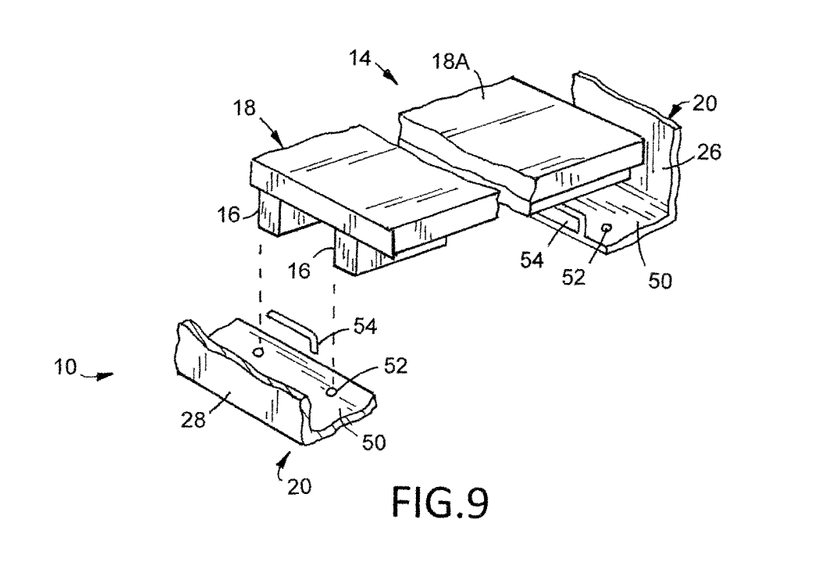
FIGS. 9 and 10 are perspective views of a plank, and associated reinforcement support studs, being positioned for seating installation atop the transverse flanges and installation between two support brackets.
Figure 10:
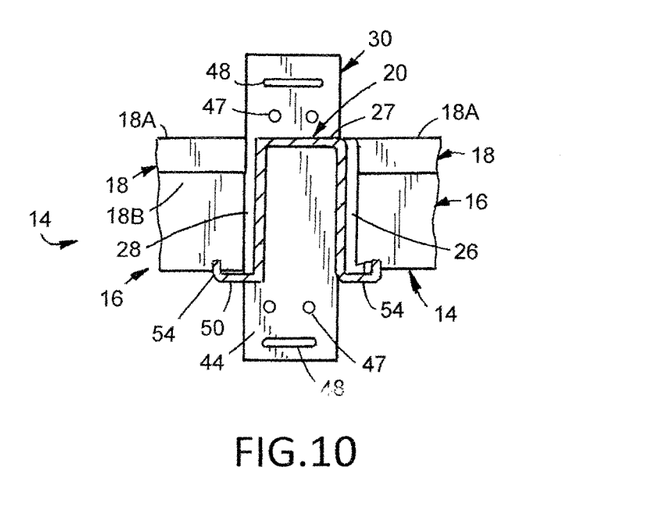
Figure 11:
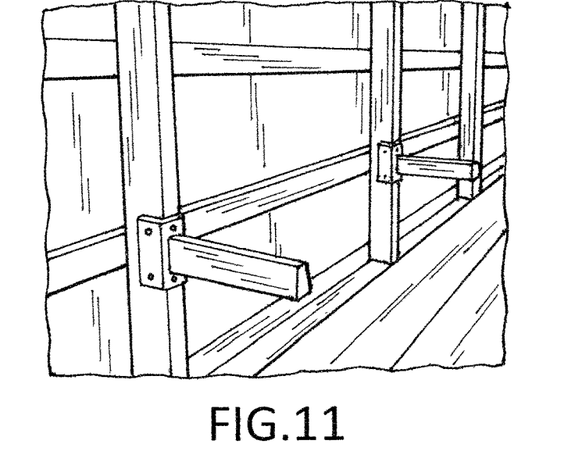
FIG. 11 is a perspective view of a pair of support brackets in accordance with the invention, each mounted on a respective vertical wall stud.

In one arrangement, and referring to FIGS. 7 and 8, the channel mount or connection mechanism 30 is formed of two elongated L-shaped members 40 and 42 such as angle irons or similar. Each L-shaped member 40 and 42 has, respectively, a base plate 44 and 46 and a side plate 32 and 34, and the base plates 44 and 46 are stacked and connected such that the base plates are slidable relative to each other to adjust the distance between the side plates and adjust to studs of different width. The terms base plate and side plate of an L-shaped angle bracket are sometimes referred to as a foot and a leg.

In one embodiment, base plate 44 may include two elongated slots 48, one and the other slot being above and below the elongated arm or support beam 20 and oriented horizontally when the support bracket 10 is mated with the wall stud 12, the other base plate 46 may include two bolts, with each bolt extending through one of the slots 48 such that the bolts are constrained for horizontal movement within their respective slots. A nut 49 may be disposed-on each bolt to tighten and loosen the connection between the two base plates to permit sliding movement and form a clamped fitment together.

Additionally, the slidable base plate 46 includes upper and lower horizontal slots, and the fixed base plate 44 is provided with apertures 47 for receiving threaded fasteners that pass through the apertures 47 and respective of the slots 48 on the flange or base plate 46 to attach the base plates 44 and 46 against the front face 12A of the wall stud 12.

As shown in FIGS. 7 and 8, the bracket 20 is positioned for attachment to a vertically oriented wall stud 12 of width "W" in a manner that the arm or support beam 20 is cantilevered and extends outwardly from the wall. The base plate 44 of the L-shaped flange 40 is fixedly attached, such as by welding, to the inner end 22 of the support beam 20. The base plate 46 of the other L-shaped flange 42 is nested for movement against the base plate 44. By loosening the nuts 49, the base plate 46 is able to move a distance "X" relative to the fixed base plate 44 to allow the channel mount 30 to fit about the stud 12 and then move the side plates 32 and 34 back and into abutment with the opposite sides 12A and 12B of the stud 12.

Apertures 36 in the side plates receive threaded fasteners to fixedly secure the mount 30 to the stud 12.

A support flange 50 extends transversely and generally horizontally from the bottom of each of the first and second sides 26 and 28 of the elongated arm or support beam 20. Each support flange 50 provides a mounting surface for a plurality of elongated support members, such as 2"×4" support studs 16, and a plurality of apertures 52 are spacedly disposed at predetermined longitudinal locations for receiving threaded fasteners for fixedly connecting the support members 16 to the arm 20. Two linear spacers 54 extend vertically upward from the outer edge of each of the support flanges. Each spacer 54 is disposed generally equidistant between two adjacent apertures 52 to assist in aligning and positioning the ends of the support studs 16 relative to the apertures 52.

The support bracket 10 may receive four 2"×4" support studs 16 on one or both sides 26 and 28 of the elongated arm 20. If the support bracket is used at the end of a length of shelving, then support studs 16 are only received on one side of the elongated arm. If the support bracket is used in between two shelf sections in a row of shelves, then the studs 16 are received on both sides of the elongated arm. An end of each support stud 16 may be set on the horizontally extending support flange 50 such that the stud extends laterally away from the respective side 26 or 28 of the elongated arm 30 to which it is mounted. Each stud 16 is aligned with one of the apertures 52 in the flange and secured thereto with a fastener such as a screw.

A trapezoidal shaped end plate 56 is disposed at the outer end 24 of the elongated arm or support beam 20. The end plate may include an attachment means such as one or more threaded apertures 58. A vertical stop (not shown) may be connected to the end plate of the support bracket via the attachment means to inhibit the egress of items from within the outer boundary of a support system formed using the support bracket as described in more detail below. The end plate also serves to rigidify the beam 20 and seat the opposite sides of the plank 18 between the base plate 44 of the mount 30 and the outer end 24 of the support beam 20 as defined by the endplate 56.

Figure 12:
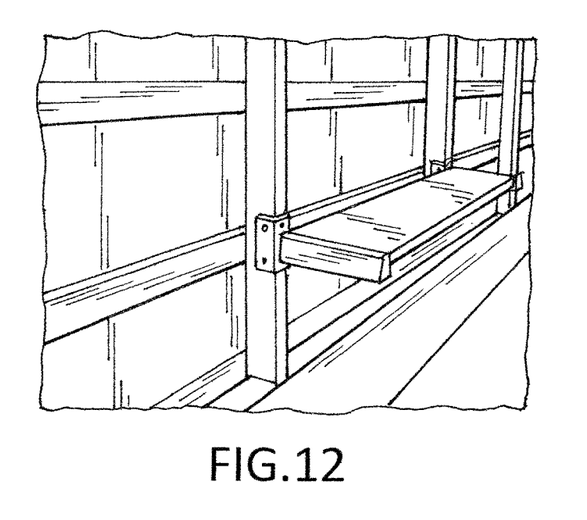
FIG. 12 is a perspective view of a shelving support system including the support brackets installed along a wall.

A shelving support system in accordance with the invention includes at least a first and second of the support brackets 10 arranged in a cantilevered and substantially vertically aligned position on a pair of spaced apart and upwardly extending studs or wall posts 12. The first and second support brackets support therebetween a plurality of support studs 16. Planks 18 lay horizontally on top of the studs 16 such that the planks 18 form a shelving rack surface for storage of a wide variety of items including but not limited to tools, construction materials, commercial inventory, personal property, and the like. Items may also be hung from the front or from underneath the shelving rack. Additionally, the shelving rack surface may-function as a workbench if installed near a floor.

Figure 13:
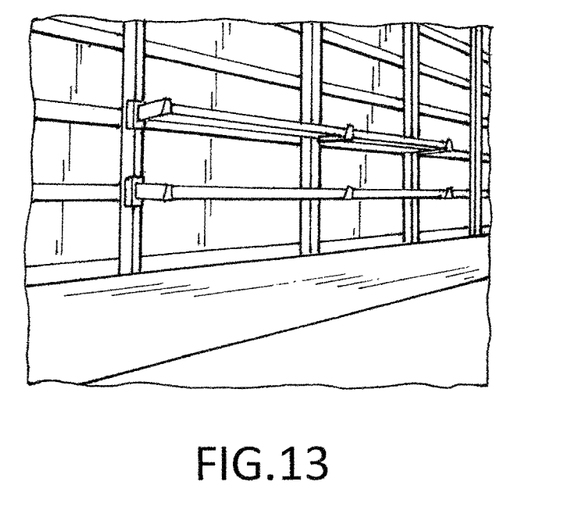
FIG. 13 is a perspective view of a shelving support assembly comprising a multiplicity of rows of brackets and shelving planks installed at different heights along a wall.
Figure 14:
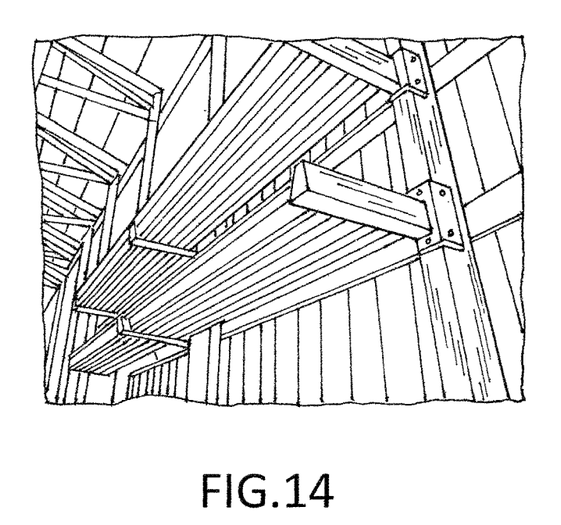
FIG. 14 is another perspective view of the multiplicity of rows of the shelving support system and the support brackets in accordance with this invention being mounted on a vertical wall stud.
Figure 15:
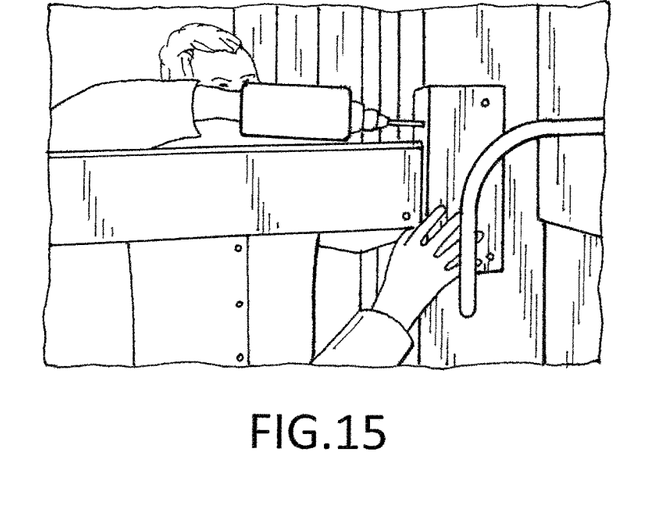
FIGS. 15-18 are perspective views of the support brackets in accordance with the invention being mounted on a vertical wall stud.
Figure 16:
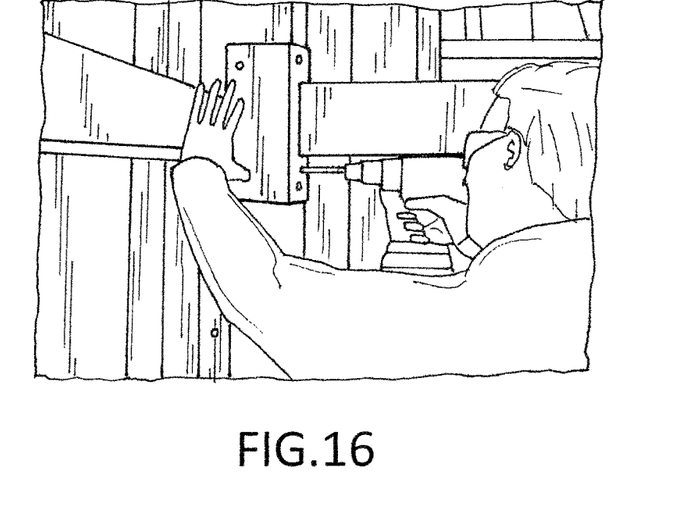
Figure 17:
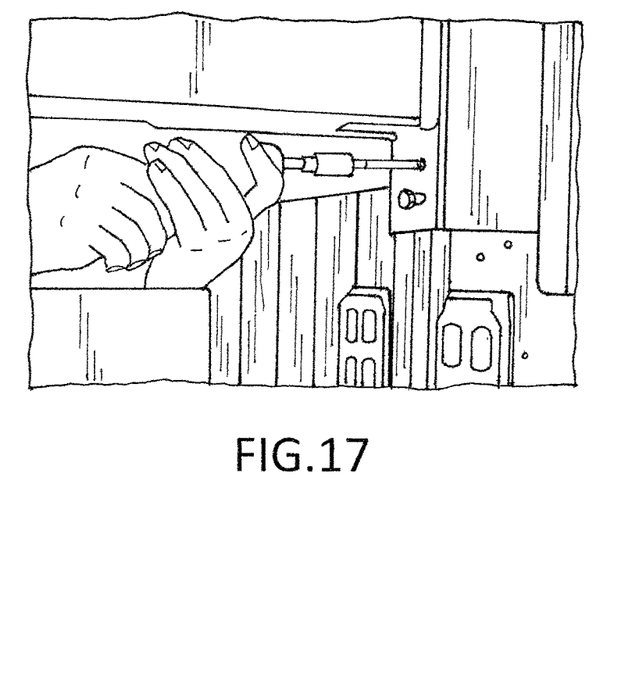
Figure 18:
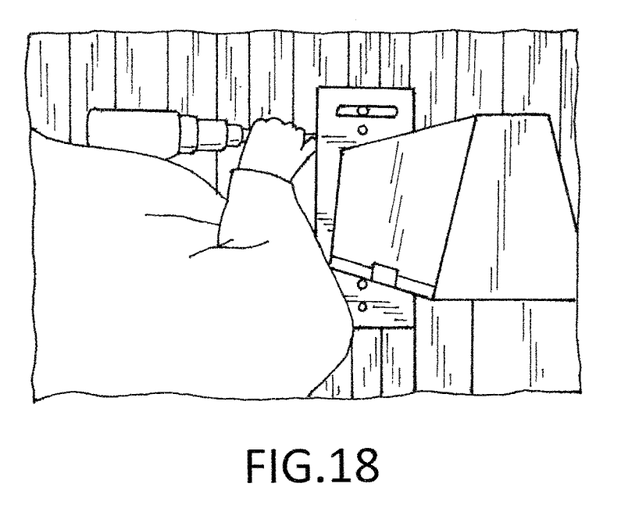
Figure 19:
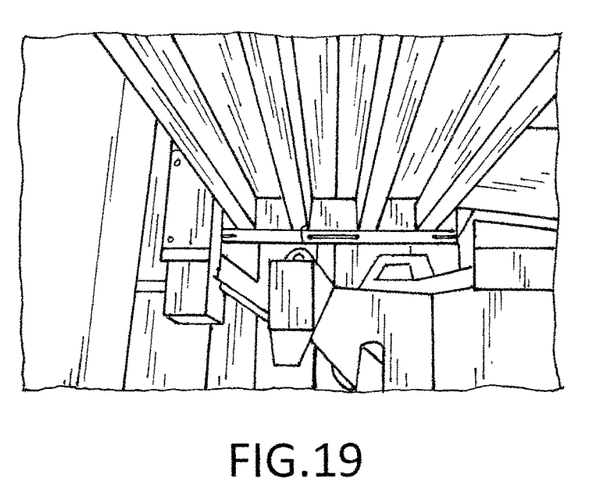
FIGS. 19 and 20 and 21 are perspective views looking at the bottom of the support bracket and the plank and bottom reinforcing studs of the plank being fastened to the support bracket.
Figure 20:
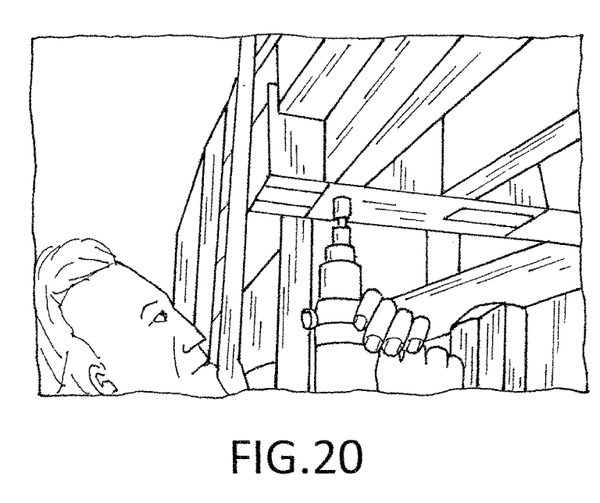
Figure 21:
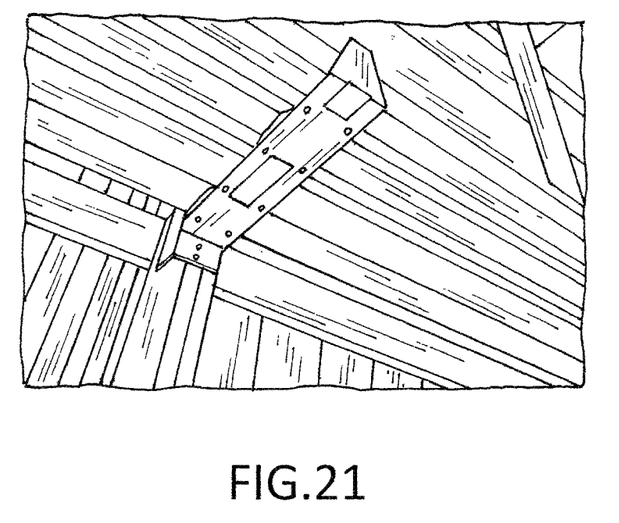

The support brackets of the shelving support system may be spaced approximately 8 feet apart, depending on the distance between the upright wall studs, and the lengths of the studs 16 and planks 18 that form the shelf 14 may be cut according to the distance between the support brackets 10. For example, four 2"×4" studs 16 may extend end-to-end between the first and second support brackets with the ends of the studs being supported by one support flange 50 of each of the respective support brackets. Each end of each stud 16 is secured to the respective support bracket 10 by a fastener that extends through one of the apertures 52 in the support flange 50. Two 2"×12" planks 18 may be placed horizontally on top of the 2"×4" studs 16, with each 2"×12" plank 18 having a bottom surface 18B being supported by and fastened to two of the 2"×4" studs with, for example, adhesive, screws, or both. The elongated arm 20 of each support bracket is sized such that an upper surface 27 of the elongated arm is generally flush with an upper surface 18A of the 2"×12" planks 18 thereby forming a flat, even, level shelving rack surface. A plurality of the support brackets and shelving board combinations may be arranged in a single row and/or may be stacked in a multiplicity of rows.

Since the support brackets of the support system are cantilevered and the shelving surface is even, items may be easily placed on and removed from the shelves without obstruction by any vertically extending members along the shelving surface even between two sections of shelving. In contrast, a standalone shelf system has vertical legs at ends of and between shelving sections which must be maneuvered around when loading and unloading items from such standalone shelves.

If the shelving rack is used to hold unstable items such as rolled stock, lengths of piping and the like, a stop such as a piece of 2"×2" lumber, a strip of metal or similar may be temporarily connected to the end plate 56 of one or more of the elongated arms by fasteners that are screwed into the threaded apertures of the attachment means. The stops limit the movement of the items stored on the shelving rack to prevent against the items falling off the shelves. The stops can be easily removed from the support bracket(s) when their use is no longer needed.

In an alternative arrangement, two support brackets may be spacedly arranged in a substantially vertically aligned disposition on a wall, without studs or planks extending between the two support brackets. In this arrangement, the two support brackets may be used to hang an item such as an extension ladder therebetween.

It should be understood that the invention is not limited in its application to the details of construction and arrangements of the components set forth herein. The invention is capable of other embodiments and of being practiced or carried out in various ways. Variations and modification of the foregoing are within the scope of the present invention.

It should also be understood that the invention disclosed and defined herein extends to all alternative combinations of two or more of the individual features mentioned or evident from the text and/or the drawings. All of these different combinations constitute various alternative aspects of the present invention. The embodiments described herein explain the best modes known for practicing the invention and will enable others skilled in the art to utilize the invention.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

NOMENCLATURE 10 support bracket
12 vertical wall stud
12A front face/12
12B side wall/12
12C side wall/12
14 shelf member
16 support stud/14
18 plank/14
18A top surface/18
18B bottom surface/18
20 elongated arm or support beam
22 inner end/20
24 outer end/20
26 side/20
27 top surface/20
28 side/20
30 channel mount or connection mechanism/at 24 of 20
32 side plate/40
34 side plate/42
36 apertures/32 and 34
38
40 L-shaped member/30
42 L-shaped member/30
44 base plate/40
46 base plate/42
47 apertures/44
48 slots/44
49 nut/46 to 44
50 support flange/20
52 apertures/50
54 spacer/50
56 trapezoidal end plate/at 24 of 20
58 apertures/56

What is claimed is:

1. A support bracket to attach a scaffold to substantially vertically oriented studs mounted to a wall, the stud having a front surface spaced from the wall and first and second side surfaces defining a U-shape with predefined width, the bracket comprising:
a longitudinally elongated scaffold support beam having an inner first end and an opposed outer second end,
the support beam having a generally U-shaped cross-section that is generally inverted, downwardly open, and includes an upper surface, a pair of laterally separated sides, and a pair of support flanges, one support flange extending transversely outward from each side, the support flanges being disposed generally horizontally for supporting a planar scaffolding plank;
a plurality of upwardly projecting spacers disposed on each support flange between the opposite ends of the support flange for positioning the scaffolding plank for mounting atop the support flange, and
an adjustable connection mechanism adapted to attach the support beam to the stud, the connection mechanism comprising a vertically oriented U-shaped member that is fixedly attached to the first end and adapted to fit about the stud, the connection mechanism comprising a pair of vertically oriented sidewalls that are laterally separated and adapted to be adjusted to enable the connection mechanism to grip the first and second sides of studs of different widths.

2. The support bracket of claim 1 wherein the U-shaped member comprises a first and a second L-shaped clamping bracket, said clamping brackets each including, respectively, a base plate and a side plate, the base plate of the first bracket fixedly connected to the first end of the support beam, the base plate of the second bracket disposed for movement atop the base plate of the first bracket, and a fastening arrangement for releasably connecting the base plates of the brackets together in a manner that the lateral separation between the side plates can be changed to fit about the stud in a manner that the side plates are moved into clamping engagement with the stud and secured against movement.

3. The support bracket of claim 2, wherein the fastening arrangement includes a laterally extending slot formed in the base plate of the first bracket, a threaded stem that extends from the base plate of the second bracket and through the slot and movable therewithin, and a fastener that connects with the stem and forces the base plates together.

4. The support bracket of claim 3, wherein the fastening arrangement includes the base plate of the first bracket including a pair of laterally extending slots, one slot and the other slot being respectively disposed above and below the support beam, the base plate of the second bracket including a pair of threaded stems, one and the other stem passing through a respective of the slots, and a pair of fasteners that connect with respective of the stems to draw the base plates together.

5. The support bracket of claim 4 wherein the base plate and side plate are provided with apertures to enable the receipt of threaded fasteners to secure the connection mechanism to the wall stud.

6. The support bracket of claim 2 wherein an end plate is fixedly attached to the forward end of the support beam, the end plate being generally trapezoidal in shape with opposite long sides of the shape extending downwardly and outwardly between the top of the beam and the outer edges of the support flange, the end plate rigidifying the support beam and including at least one aperture for receiving a fastener for mounting a vertical stop to the forward end of the support beam.

7. A shelving support system, comprising
at least a first and second support bracket arranged in a cantilevered and substantially vertically aligned position on a pair of spaced apart and upwardly extending studs or wall posts, the first and second support brackets having a forward and rearward end, a mount extending rearwardly from the rearward end, the mount being vertically oriented and provided with
a support beam having a generally U-shaped cross-section that is generally inverted, downwardly open, and includes an upper surface, a pair of laterally separated sides, and a pair of support flanges, one support flange extending transversely outward from each side, the support flanges being disposed generally horizontally for supporting a planar scaffolding plank;
a plurality of upwardly projecting spacers disposed on each support flange between the opposite ends of the support flange; and a work surface that extends between the wall posts and has opposite end portions supported on the transverse support flanges.

8. The shelving support system of claim 7 wherein the work surface includes a generally planar rectangular plank having upper and lower surfaces and opposite ends, and a plurality of support beams that are generally coextensive with the opposite ends of the plank which project downwardly from the lower surface of the plank, the opposite ends of the support beams being supported on the transverse support flanges of the at least two support brackets.

9. The shelving support system of claim 7, wherein the work surface comprises four support beams, and apertures proximate to the ends of the spacers, the spacers positioning the support beams relative to the apertures for attachment to the flanges.

10. A shelving and scaffolding assembly, comprising:
a pair of wall studs, said wall studs being mounted on a wall in laterally separated relation and disposed in a substantially vertical orientation, each wall stud including a front surface spaced from the wall and first and second side surfaces separated by a specific width;
a pair of platform support brackets, said support brackets mounted in cantilever fashion onto one and the other respective wall stud, each support bracket comprising:
a longitudinally extending support beam, each beam having first and second ends, and an adjustable connection mechanism attached to the first end to connect the support beam to a wall stud, the connection mechanism including first and second L-shaped flanges disposed in nested relation and forming a U-shaped channel member, the first L-shaped flange including a base plate fixedly attached to the first end of the support beam and a side plate adapted to engage one side surface of the wall stud, the second L-shaped flange including a base plate movably disposed against the base plate of the first flange and adapted to move towards and away from the base plate of the first L-shaped flange and move the side plates into gripping engagement with the side surfaces of the wall stud, and a securement arrangement for fixedly securing the base plates together and against movement; and
a fastening arrangement to fixedly attach the U-shaped channel member of the bracket to the respective wall stud, and
a planar scaffold platform connected to and extending horizontally between the support beams
the support beam having a generally U-shaped cross-section that is generally inverted, downwardly open, and includes an upper surface, a pair of laterally separated sides, and a pair of support flanges, one support flange extending transversely outward from each side, the support flanges being disposed generally horizontally for supporting a planar scaffolding plank;
a plurality of upwardly projecting spacers disposed on each support flange between the opposite ends of the support flange for positioning a scaffolding plank for mounting atop the support flange.

11. The shelving and scaffolding assembly of claim 10, wherein the connection member comprises the first base plate including a horizontally extending slot, the second base plate including a threaded upstanding post, the post extending into the slot for constraining lateral movement of the second base plate relative to the first base plate, and a nut connection to the threaded post to force the base plates together and secured from movement.

12. The shelving and scaffolding assembly of claim 10, wherein the planar scaffold platform includes a planar plank having upper and lower surfaces, and a plurality of support studs project from the bottom surface, the support studs having opposite longitudinal ends supported by the support brackets.

13. The shelving and scaffolding assembly of claim 10, further comprising:
a series of wall studs, said studs being mounted on a wall in laterally separated relation and in a substantially vertical orientation, each wall stud including a front surface spaced from the wall and first and second side surfaces separated by a specific width;
a corresponding series of platform support brackets, said support brackets mounted in cantilever fashion onto respective of the wall studs, and
a respective series of planar scaffold platforms connected to and extending horizontally between respective pairs of support beams, the connected platforms when assembled forming an elongated essentially continuous horizontal surface for work or storing.

14. The shelving and scaffolding assembly of claim 10, further comprising:
a series of wall studs, said studs being mounted on a wall in laterally separated relation and in a substantially vertical orientation, each wall stud including a front surface spaced from the wall and first and second side surfaces separated by a specific width;
a first and a second corresponding series of platform support brackets, said support brackets mounted in cantilever fashion onto respective of the wall studs, and said first and second series of platform support brackets being spaced vertically from one another on respective wall studs; and
a respective first and second series of planar scaffold platforms, the first and second series of scaffold platforms, respectively, connected to and extending horizontally between respective pairs of the support beams, the connected platforms of the first series and second series when assembled to their associated pairs of support brackets forming two levels of vertically separated, elongated, continuous, horizontally extending, surfaces for work or storing.

* * * * *